United States Patent [19]

Kitagawa

[11] 4,194,425

[45] Mar. 25, 1980

[54] KEY CODE GENERATOR

[75] Inventor: Hiroshi Kitagawa, Hamamatsu, Japan

[73] Assignee: Kabushiki Kaisha Kawai Gakki Seisakusho, Mamamatsu, Japan

[21] Appl. No.: 827,214

[22] Filed: Aug. 24, 1977

[51] Int. Cl.[2] .......... G10H 1/00; H04J 1/00

[52] U.S. Cl. .......... 84/1.01; 84/DIG. 2; 340/166 R; 340/365 S

[58] Field of Search .......... 84/1.01, 1.03, 1.24, 84/DIG. 2; 340/166 R, 365 R, 365 S

[56] References Cited

U.S. PATENT DOCUMENTS

| | | | |
|---|---|---|---|
| 3,929,051 | 12/1975 | Moore | 84/1.01 X |
| 4,019,417 | 4/1977 | Carlson | 84/1.01 |
| 4,041,825 | 8/1977 | Pascetta | 84/1.01 |
| 4,138,916 | 2/1979 | Kitagawa | 84/1.01 |
| 4,138,917 | 2/1979 | Sakashita et al. | 84/1.01 |
| 4,141,268 | 2/1979 | Kugisawa | 84/1.03 |

FOREIGN PATENT DOCUMENTS

| | | | |
|---|---|---|---|
| 52-130620 | 11/1977 | Japan | 84/1.01 |

*Primary Examiner*—S. J. Witkowski

[57] ABSTRACT

In a key code generator which has key code generator circuits, each corresponding to one of a plurality of key switches and composed of a memory circuit for storing the status of the key switch with a master clock pulse, a circuit for detecting the status change of the key switch to its depressed or release state, means for deriving a key code from the outputs of the memory circuit and the detecting circuit, means for producing a latch pulse from the master clock pulse and the key code and means for completing the output generation with the master clock pulse, a circuit for determining priority of the key code generator circuits, and a control circuit for giving priority to key release over key depression when key switches are simultaneously released and depressed, respectively, there is provided a time-division device which comprises a key switch (m×n) matrix circuit composed of the plurality of key switches inputting key switch information to the key code generator circuits, means for transferring the key switch information from the key switch matrix circuit every octave while time dividing the key switch information to m, and a control circuit for sequentially storing the key switch information in m blocks of the key code generator circuits, each block being composed of n key code generator circuits.

1 Claim, 9 Drawing Figures

Cl_a m1
m2
m3
m6

Cl_b

G2
G3

SW2-1
SW2-2
SW3-2

KCD
SW2-1
SW2-2
SW3-2
SW2-1
SW2-2
SW3-2

KEY CODE GENERATOR

BACKGROUND OF THE INVENTION

1. Field of the Invention

This invention relates to a key code generator which has means for sending key code data in a time-divisional manner for storage in key code generator circuits.

2. Description of the Prior Art

In apparatus having a large number of key switches, such as an electronic organ, a very large amount of wiring is required for directly connecting the key switches to desired circuits so that on-off information of the former may be supplied to the latter. To avoid this, there has usually been employed the time division multiplex system in which the on-off information is converted by time-divisional scanning of the key switches into a TDM (Time Division Multiplex) or PCM (Pulse Code Modulation) signal and sent to a key code memory. With this system, however, since the on-off states of the key switches are checked in the time-divisional manner, information of the key switches in the off state is also sent, so that one scanning period is required for sending necessary information, and a clock pulse of a very high frequency, for example, several hundred kilohertzes, is needed for a rapid response to the key depression and release. Further, the response time lags due to the relationship of the moments of key depression and release to one scanning period: for instance, when a depressed key switch is released immediately after being scanned, the response time lags about one scanning period.

To overcome the abovesaid defects, a novel key assignor is proposed in an application filed in Japan under Japanese Pat. application No. 47557/76 entitled "Key Assignor" filed concurrent with the Japanese application corresponding to that of the present application on Apr. 26, 1976 and published in Japan under number 130620/77 on Nov. 2, 1977, and assigned to the same assignee as the present application. The key assignor employs such a key code generator as described in detail in an embodiment of this invention, and is adapted to send the key code of a key switch in the cases of its depression and release without scanning the key switches. In this case, the purpose can well be achieved with clock pulses for simultaneously checking the states of all the key switches and the time for sending their key code data. The abovesaid key assignor has the advantages of a low clock frequency and a very rapid response. In this key assignor, however, input lines of the same number as the key switches must be connected to the latter. In the case of fabricating these circuits as integrated ones, it is necessary to minimize the input lines from the key switches because of a limitation imposed on the number of pins of semiconductor elements.

SUMMARY OF THE INVENTION

Accordingly, this invention is to provide a key code generator which requires less input and output lines but does not impair its merits.

According to this invention, there is provided a key code generator which has key code generator circuits, each corresponding to one of a plurality of key switches and composed of a memory circuit for storing the status of the key switch with a master clock pulse, a circuit for detecting the status change of the key switch to its depressed or released state, means for deriving a key code from the outputs of the memory circuit and the detecting circuit, means for producing a latch pulse from the master clock pulse and the key code and means for completing the output generation with the master clock pulse, a circuit for determining priority of the key code generator circuits, and a control circuit for giving priority to key release over key depression when key switches are simultaneously released and depressed, respectively, and which is characterized by a time-division device composed of a key switch ($m\times n$) matrix circuit composed of the plurality of key switches inputting key switch information to the key code generator circuits, means for transferring the key switch information from the key switch matrix circuit every octave while time dividing the key switch information to m, and a control circuit for sequentially storing the key switch information in m blocks of the key code generator circuits, each block being composed of n key code generator circuits.

The key code generator of this invention has memories for storing the on-off states of key switches, and hence is suitable for the time-sharing use, and the timing sharing operation does not hinder the key code generation. Further, in the key code generation in response to the on-off operation of the key switches, a time lag in the time-sharing operation is entirely negligible in view of a permitted limit of the clock frequency of the key code generator. Accordingly, the number of input and output lines can be effectively decreased without imparing the merits of the key code generator.

DESCRIPTION OF THE PREFERRED EMBODIMENTS

Figure 1:
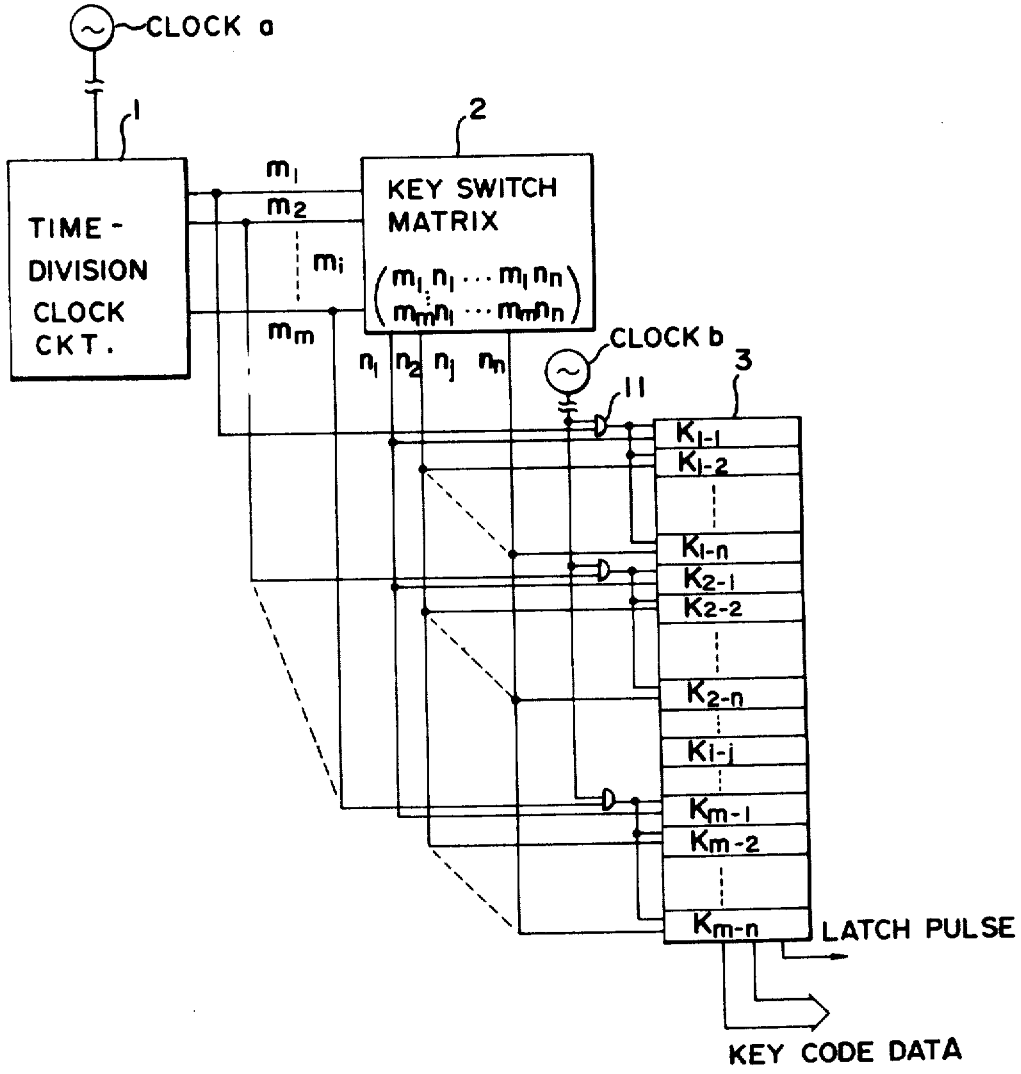
FIG. 1 is a schematic electric drawing showing the basic features of the present invention.

FIG. 1 is explanatory of the outline of this invention, showing the construction of its embodiment. In FIG. 1, a key switch matrix 2 is an ($m\times n$) matrix and key data are time divided by a time-division clock circuit 1 into $m_1, m_2 \ldots m_m$, and sequentially outputted in groups of n bits and applied to a key code generator circuit group 3. The key code generator circuit group 3 is also composed of m blocks, each comprising n key code generator circuits, as is the case with the key switch matrix 1. A time-division clock circuit 1 is formed with a ring counter or shift register which is supplied with the clock pulse a from a clock pulse source. The clock pulse a has a frequency represented by fa. A clock pulses b of a frequency fb, which is applied to each memory circuit of the key code generator circuit group 3 from a clock pulse source, is ANDed with the clock pulse a of the frequency fa in each gate 11, the output from which is applied to each block. In this case, the clock pulse b may be one synchronized with the clock pulse a, or the frequencies of the both clock pulses may also be selected to bear such a relation as $fb \geqq 2fa$ so as to satisfy the sampling theorem. In the present embodiment, let it be assumed that the clock pulses a and b have the same frequency and are synchronized with each other from the viewpoint of lowering the clock frequency. Based on the time-divided key data derived from the key switch matrix 2, the on-off states of the key switches are sequentially written by the clock pulses b in the memory circuits of the respective blocks of the key code generator circuit group 3. With this key data detection, the key code generator circuits sequentially output key code data in accordance with priority preset regardless of the time-division clock pulse.

Figure 2:
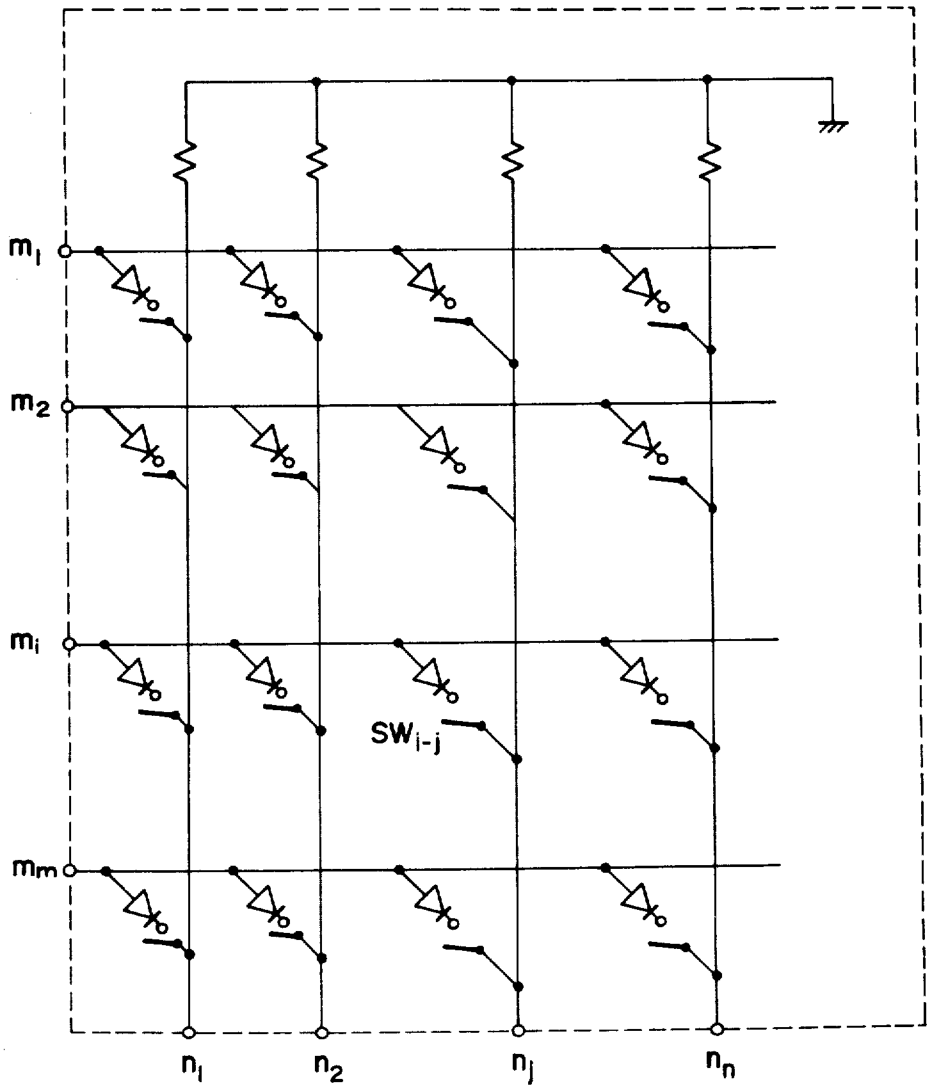
FIG. 2 is a circuit drawing showing the key switch matrix.

FIG. 2 illustrates the construction of the key switch matrix 2, which is composed of m rows and n columns. That is, the key switch matrix 2 is scanned by the time-division clock pulse a from $n_1$ to $n_m$ and, as a result of this, n output bits are derived from the key switch matrix 2 at time intervals of m minutes. Assuming that a switch $SW_{i-j}$ is pressed, "1" is derived at an output nj in a time slot i, that is, at the moment of scanning the row mi. At the same time, the output "1" is applied to a key code generator circuit $K_{i-j}$ of the block i of the key code generator circuit group 3 which comprises n blocks.

Figure 3:
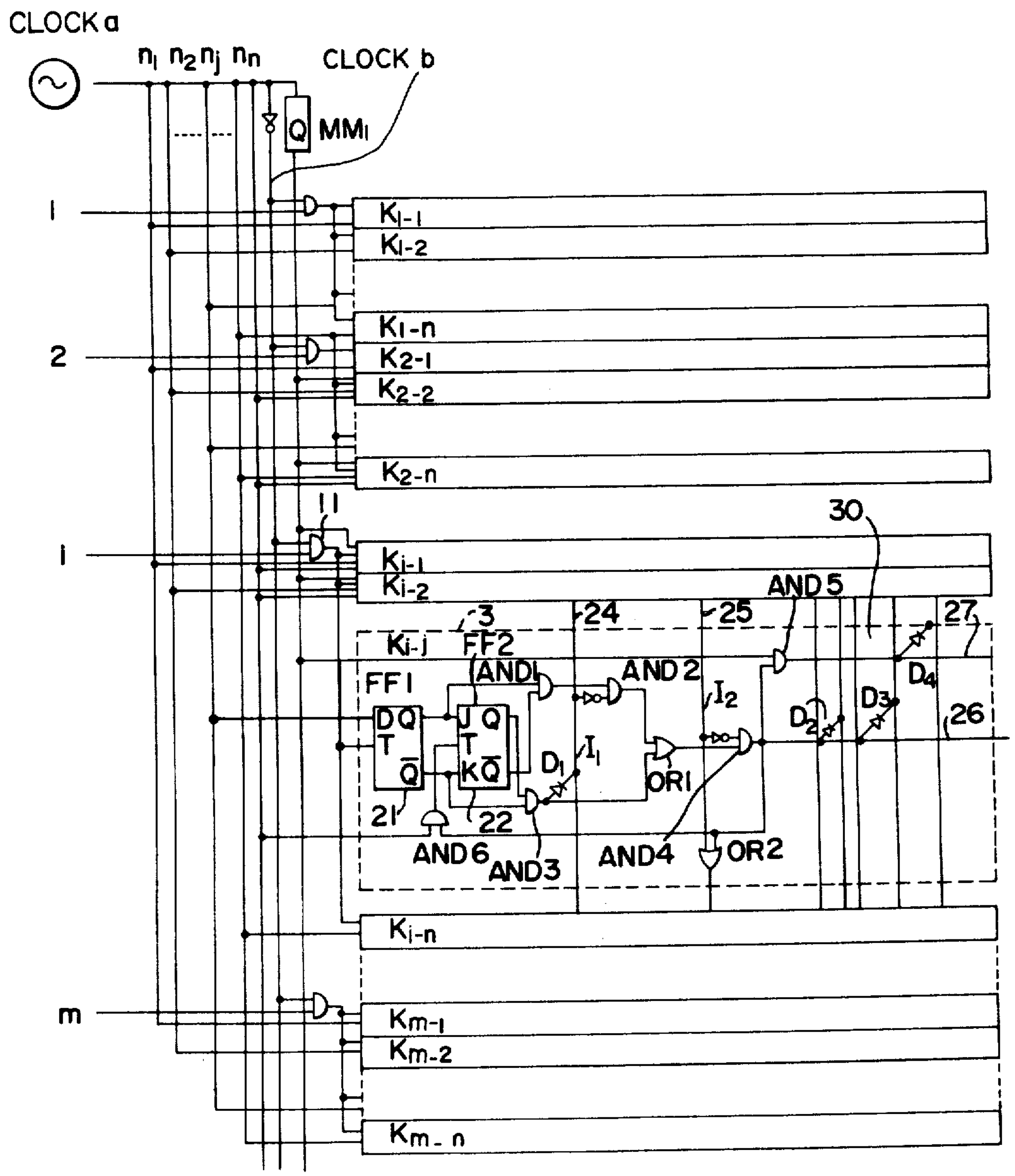
FIG. 3 shows a typical key code generator circuit utilized in FIG. 1.

FIG. 3 shows a typical key code generator circuit $(K_{i-j})3$ in the FIG. 1 embodiment, which circuit is surrounded by broken lines. Assuming that the key switch $SW_{i-j}$ is pressed, "1" is applied to a D terminal of a D flip-flop (FF1) 21 in the time slot i. At the same time, the gate 11 is opened to apply therethrough the clock pulse b to a T terminal, deriving "1" at the Q output of a flip-flop 21. The $\overline{Q}$ output from a JK-type flip-flop (FF2) 22 is "1" and an AND gate AND1 is supplied with the Q output "1" from the flip-flop 21 and the $\overline{Q}$ output "1" from the flip-flop 22 to provide "1". In this case, if the other key code generator circuits do not generate any key codes based on releasing of key switches, another similar AND gate AND3 outputs "0" and a line $(I_1)$ 24 coupled with the AND gate AND3 through a diode D1 outputs "0". The output "1" from the AND gate AND1 and an inverted output "1" from the line 24 are applied to an AND gate AND2 to derive therefrom "1", which is applied to an OR gate OR1 to derive therefrom "1". At this time, if a key code generator circuit $K_{p-q}(K_{1-1} \leqq K_{p-q} < K_{i-j})$ above the key code generator circuit $K_{i-j}$ is not in the key-releasing or key-pressing state, "0" is applied to a line $(I_2)$ 25 which is so connected as to apply an input to an AND gate AND4 through an inverter, so that "1" is applied to the AND gate AND4. Thus, the AND gate AND4 is supplied with the outputs "1" from the OR gate OR1 and the line 25 to provide an output "1". The output from the AND gate AND4 is applied to an OR gate OR2 to derive therefrom "1". With this output, the key code generator circuits under the key code generator circuit $K_{i-j}$ are inhibited from the key code generation and held in the waiting state. When "1" and "0" are applied to J and K terminals of the JK flip-flop 22, respectively, the flip-flop 22 is set by the clock pulse applied to an AND gate AND6 and the $\overline{Q}$ output from the flip-flop 22 becomes "0" and the outputs from the gates AND1, AND2, AND3, OR1, AND4, AND5, OR2 and AND6 become "0", stopping the key code generation and releasing the other key code generator circuits from inhibition of key code generation and from the waiting state.

Next, in the case where the switch $SW_{i-j}$ is released, "0" is applied to the D terminal of the flip-flop 21 in the time slot i and, at the same time, the gate 11 is opened, through which the clock pulse b is applied to the T terminal of the block i, providing "1" at the $\overline{Q}$ output of the flip-flop 21. The flip-flop 22 derives "1" at its Q output. Accordingly, the AND gate AND3 supplied with the outputs from the both flip-flops 21 and 22 produces an output "1", which is applied to the OR gate OR1 to derive therefrom "1". At the same time, the output "1" from the AND gate AND3 is applied to similar lines $(I_1)$ 24 of other key code generator circuits so that key code generation by the key code generator circuit $K_{i-j}$ based on the key depression may be inhibited. Further, if no key code is generated in the circuit $K_{p-q}(K_{1-1} \leqq K_{p-q} < K_{i-j})$ above the key code generator circuit $K_{i-j}$, "0" is applied to a line $(I_2)$ 25, and is inverted to provide "1". The AND gate AND4 is supplied with the outputs "1" from the OR gate OR1 and the line $(I_2)$ 25 to provide an output "1". As in the case of key depression, the key switch code of the stage i−j is inputted to a diode matrix 30 with the output "1" from the AND gate AND4 to obtain an output corresponding to the key code through a line 26. For instance, such data are outputted that eight bits are encoded by diodes $D_2$ to $D_4$. At the same time, the output Q from a monostable multivibrator MM1 and the output "1" from the AND gate AND4 are applied to the AND gate AND5 to derive a latch pulse of the key code data from a line 27 through the diode D4. Further, the output from the AND gate AND4 is applied to the OR gate OR2, from which "1" is applied to the line $(I_2)$ 25 of each of the key code generator circuit below the circuit $K_{i-j}$, so that the output from the line 25 is inverted to "0", inhibiting the key code generation. Next, when "0" and "1" are applied to the J and K terminals of the flip-flop 22, respectively, the flip-flop 22 is reset by the clock pulse applied to the AND gate AND6, by which the Q output from the flip-flop 22 is altered to "0", thus completing the key code generation.

Further, in the case where key codes are simultaneously generated by the depression and release of keys, the output from the AND gate AND3 is applied to the line $(I_1)$ 24 of each key code generator circuit to give priority to the key code generation by the key release, and the output from the AND gate AND4 is applied through the OR gate OR2 to the line $(I_2)$ 25 of each key code generator circuit under the circuit $K_{i-j}$ to give priority to a high-pitched sound. In accordance with this priority, the key code data are outputted.

Figures 4A, 4B, 4C, 4D, 4E, 4F:
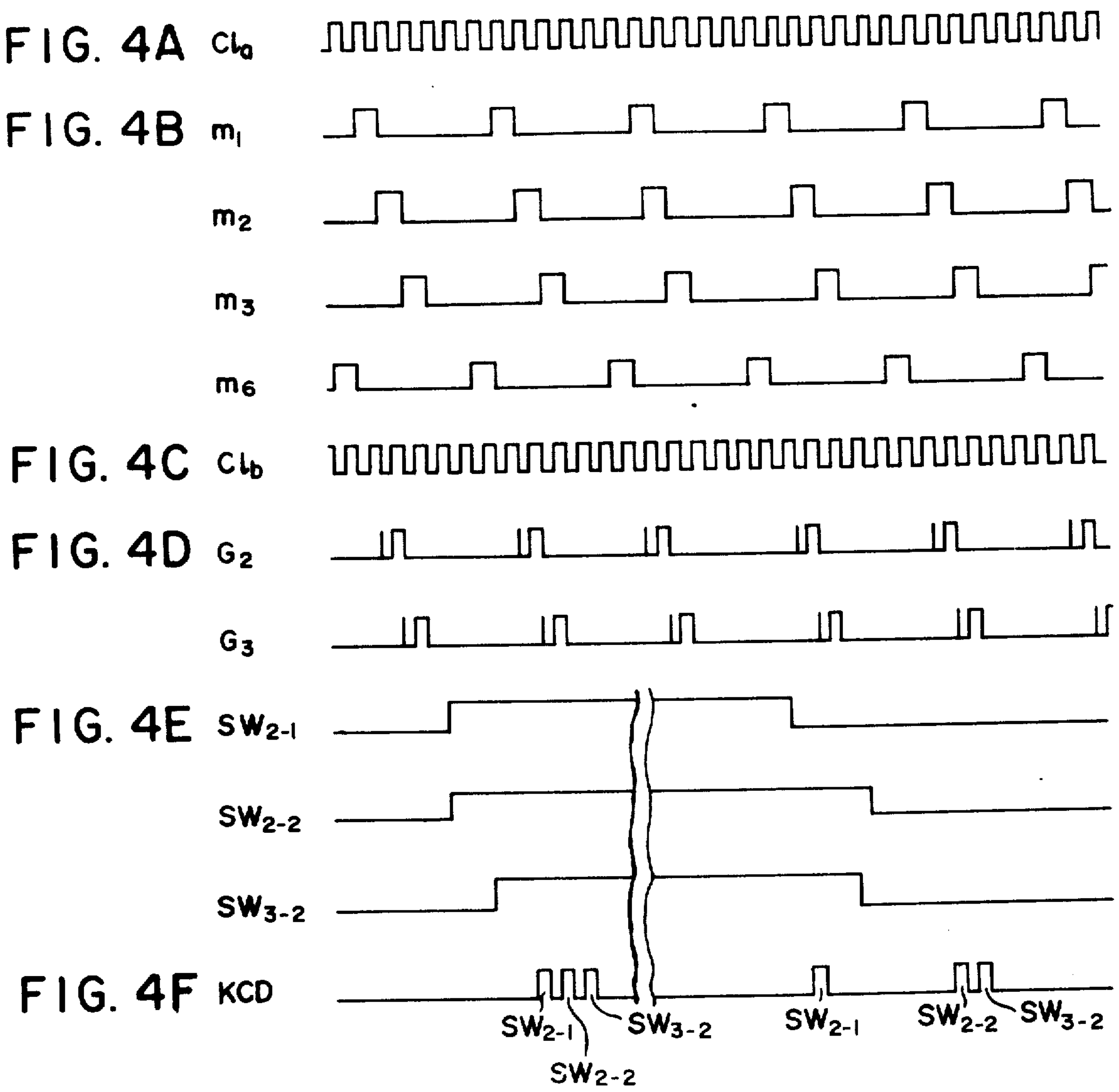
FIGS. 4A–4F show timing drawings useful in explaining the operation of the present invention.

FIGS. 4A–4F is a timing chart of the operation of an embodiment of this invention in which the switch matrix is composed of six rows and twelve columns and the key code generator circuit group is composed of six blocks, each comprising twelve circuits corresponding to six blocks of key switches. Further, the clock pulse b is the negative logical output of the clock pulse a, and memorizes the state of the key switch. The clock pulse supplied to the T terminal of the flip-flop 22 is the same as the clock pulse a. The clock pulse a is shown by the waveform Cla in FIG. 4A and the clock pulse b the waveform Clb in FIG. 4C. FIG. 4B shows the time-division time slots in the case of m=6. Now, let it be assumed that three key switches $SW_{2-1}$, $SW_{2-2}$ and $SW_{3-2}$ are respectively depressed and released as indicated in FIG. 4E. In this case, the switches $SW_{2-1}$ and $SW_{2-2}$ both belong to the time slot 2, and are simultaneously depressed and, on the other hand, the switch $SW_{3-2}$ belongs to the time slot 3, and is depressed a little later. These switches are released at different moments, respectively. The key code outputs from the abovesaid key switches are controlled by the time slots $m_2$ and $m_3$ shown in FIG. 4B and gate output pulses $G_2$ and $G_3$ of FIG. 4D which are derived from the clock pulse b of FIG. 4C. In this case of simultaneous key depression, priority is given to a high-pitched sound. Accordingly, in the case of key depression, the key switches provide their key code outputs in accordance with priority in the manner shown in FIG. 4F. That is, the key switch $SW_{2-1}$ produces its key code output with the pulse $G_2$ immediately following it and the key switch $SW_{2-2}$ produces its key code output one time slot behind the key switch $SW_{2-1}$ and then the key switch $SW_{3-2}$ produces its key code output one time slot behind the key switch $SW_{2-2}$. In the case of key release, the key switch $SW_{2-1}$ outputs corresponding to the pulse $G_2$ immediately following the release of the key switch and then the key switches $SW_{2-2}$ and $SW_{3-2}$ output in accordance with the order of the pulses $G_2$ and $G_3$ immediately following the release of those key switches, respectively. With the formation of such key code outputs, time lag in the response to the key depression and release is a little but not so large as in the conventional scanning system, and consequently it is possible to achieve key code generation of quick response.

With this invention described in the foregoing, the clock frequency used is lower than that in the prior art scanning system and the response to the key depression and release is very quick and time lag in the response is very small. Further, key switches are provided in the form of a matrix and connected to key code generator circuits and used in a time-divisional manner, by which the number of input and output lines used between the key switches and the key code generator circuits can be reduced. That is, in the case of directly connecting $m \times n$ points of the matrix structure to the key code generator circuits, the number of input and output lines used is $m \times n$, whereas in the case of using the matrix in the time-sharing manner the number of input and output lines can be reduced to $m+n$.

Moreover, where the time-sharing techniques are not employed, the time for outputting the key codes in the case of simultaneous status change of X key switches at maximum is $(X+1) \times 100$ microseconds if the clock pulse used is of 100 microseconds. In the present invention, however, the abovesaid time is $(m+X+1) \times 100$ microseconds at maximum and the response time becomes a little longer due to the time-division number m. But m reduces the number of input and output lines: for example, in the case of 256 key switches, if $m=8$ and if $n=32$, $8 \times 32=256$, so that the number of input and output lines used is $8+32=40$. In this case, since $m=8$, it is apparent that the response property is not degraded by the time division. Further, a response speed substantially equal to that in the conventional system can also be obtained by increasing the clock frequency to $(m+X+1/X+1)=(m/X+1)+1$ times. In the present invention, such a little rise of the clock frequency does not matter, since it is one of the feature of the key code generating method employed in this invention that a low clock frequency can be employed.

It will be apparent that many modifications and variations may be effected without departing from the scope of novel concepts of this invention.

What is claimed is:

1. A Key code generator comprising:

first and second clocks, each producing a respective predetermined clock output;

a plurality of key code generator circuits, each key code generator circuit respectively corresponding to one of a corresponding plurality of key switches, and each key code generator circuit comprised of a first memory circuit for storing therein the state of the corresponding key switch by means of said predetermined first clock, a second memory circuit for storing therein the output from said first memory circuit, a transition detector circuit for detecting the change of state of the key switch to its depressed and then released state from the output from said first and second memory circuits, means for generating a key code corresponding to the key switch from the output from the transition detector circuit, and means for applying the first clock to the second memory circuit to complete the key code generation;

priority means for achieving the transition detecting operation in the key code generator circuit group in accordance with a predetermined priority to thereby generate the key codes from the key code generator circuits in decreasing order of priority while temporarily inhibiting the outputs from the transition detector circuits of lower priority to prevent the key code generation therefrom;

control means for inhibiting the key code generation based on the depression of a key in favor of the key code generation based on the release of a key; and a time division circuit comprised of an $(m \times n)$ key switch matrix circuit composed of said plurality of key switches, each key switch respectively connected with one of the key code generator circuits, means for transferring key switch information from the key switch matrix circuit for each octave, the key switch information being time divided into m groups of switches with n switches in each group by said second clock which is of a lower speed than said first clock, and a control circuit for sequentially storing at said lower speed the key switch information into the key code generator circuits, and wherein said key code generator circuits are correspondingly divided into m blocks, each block composed of n key code generator circuits.

* * * * *